United States Patent
Lin et al.

(10) Patent No.: US 9,479,962 B2
(45) Date of Patent: *Oct. 25, 2016

(54) METHOD OF TDM IN-DEVICE COEXISTENCE INTERFERENCE AVOIDANCE

(71) Applicant: MEDIATEK Singapore Pte. Ltd., Singapore (SG)

(72) Inventors: Kuhn-Chang Lin, Chiayi (TW); I-Kang Fu, Taipei (TW); York Ted Su, Chiayi (TW)

(73) Assignee: MEDIATEK SINGAPORE Pte. Ltd., Singapore (SG)

( * ) Notice: Subject to any disclaimer, the term of this patent is extended or adjusted under 35 U.S.C. 154(b) by 79 days.

This patent is subject to a terminal disclaimer.

(21) Appl. No.: 14/307,497

(22) Filed: Jun. 18, 2014

(65) Prior Publication Data
US 2014/0293973 A1    Oct. 2, 2014

Related U.S. Application Data (63) Continuation of application No. 13/200,775, filed on Sep. 29, 2011, now Pat. No. 8,780,880.

(60) Provisional application No. 61/388,687, filed on Oct. 1, 2010.

(51) Int. Cl.
*H04W 28/04* (2009.01)
*H04W 72/12* (2009.01)
(Continued)

(52) U.S. Cl.
CPC ....... *H04W 28/044* (2013.01); *H04W 72/0446* (2013.01); *H04W 72/1215* (2013.01); *H04W 76/048* (2013.01); *H04W 88/06* (2013.01)

(58) Field of Classification Search
CPC ........... H04W 88/06; H04W 72/1215; H04W 72/1289; H04L 5/0053; H04L 1/00
See application file for complete search history.

(56) References Cited

U.S. PATENT DOCUMENTS 7,634,232 B2   12/2009   Waxman ............... 455/63.1
7,809,012 B2   10/2010   Ruuska et al. ............ 370/449
(Continued)

FOREIGN PATENT DOCUMENTS

CN    1731692 A    2/2006
CN    101132368 A    2/2008
(Continued)

OTHER PUBLICATIONS

International Search Report and Written Opinion of International Search Authority for PCT/CN2011/075963 dated Sep. 8, 2011 (11 pages).

(Continued)

*Primary Examiner* — Jung Park
(74) *Attorney, Agent, or Firm* — Imperium Patent Works; Zheng Jin (57) ABSTRACT

A method of TDM in-device coexistence (IDC) interference avoidance is proposed. In a wireless communication device, a first radio module is co-located with a second radio module in the same device platform. The first radio module obtains traffic and scheduling information of the second radio module. The first radio module then determines a desired TDM pattern based on the traffic and scheduling information to prevent IDC interference with the second radio module. The first radio module also transmits TDM coexistence pattern information based on the desired TDM pattern to a base station. In one embodiment, the TDM coexistence pattern information comprises a recommended TDM pattern periodicity and a scheduling period to maximize IDC efficiency subject to limited level of IDC interference possibility. In one specific example, the TDM coexistence pattern information comprises a set of discontinuous reception (DRX) configuration parameters defined in long-term evolution (LTE) 3GPP standards.

17 Claims, 8 Drawing Sheets

(51) Int. Cl.
 *H04W 76/04* (2009.01)
 *H04W 72/04* (2009.01)
 *H04W 88/06* (2009.01)

(56) References Cited

U.S. PATENT DOCUMENTS

| | | | | |
|---|---|---|---|---|
| 8,345,652 | B2 | 1/2013 | Banerjea et al. | 370/338 |
| 2004/0224719 | A1 | 11/2004 | Nounin et al. | 455/553.1 |
| 2005/0059347 | A1 | 3/2005 | Haartsen | 455/41.2 |
| 2006/0217071 | A1 | 9/2006 | Russo et al. | 455/66.1 |
| 2007/0021066 | A1 | 1/2007 | Dravida et al. | 455/41.2 |
| 2007/0165754 | A1 | 7/2007 | Kiukkonen et al. | 375/346 |
| 2007/0263709 | A1 | 11/2007 | Kasslin et al. | 375/222 |
| 2008/0043705 | A1 | 2/2008 | Desai et al. | 370/346 |
| 2008/0075059 | A1 | 3/2008 | Kermoal et al. | 370/343 |
| 2008/0080555 | A1 | 4/2008 | Carter et al. | 370/470 |
| 2008/0200195 | A1 | 8/2008 | Abe et al. | 455/501 |
| 2008/0253352 | A1 | 10/2008 | Thoukydides et al. | 370/345 |
| 2009/0017756 | A1 | 1/2009 | Tsfaty et al. | 455/41.2 |
| 2009/0028115 | A1 | 1/2009 | Hirsch | 370/337 |
| 2009/0040937 | A1 | 2/2009 | Xhafa et al. | 370/252 |
| 2009/0054009 | A1 | 2/2009 | Yang et al. | 455/78 |
| 2009/0081962 | A1 | 3/2009 | Sohrabi | 455/79 |
| 2009/0088177 | A1 | 4/2009 | Yang et al. | 455/452.2 |
| 2009/0168716 | A1 | 7/2009 | Moon et al. | 370/329 |
| 2009/0225717 | A1 | 9/2009 | Banerjea | 370/329 |
| 2009/0247218 | A1 | 10/2009 | Lee et al. | 455/553.1 |
| 2009/0252122 | A1 | 10/2009 | Leinonen et al. | 370/332 |
| 2009/0257208 | A1 | 10/2009 | Filipovic et al. | 361/760 |
| 2009/0262785 | A1 | 10/2009 | Wilhelmsson | 375/133 |
| 2009/0298440 | A1 | 12/2009 | Takeya et al. | 455/67.14 |
| 2009/0322596 | A1 | 12/2009 | Rowitch et al. | 342/357.1 |
| 2010/0008336 | A1 | 1/2010 | Keidar et al. | 370/338 |
| 2010/0027525 | A1 | 2/2010 | Zhu | 370/350 |
| 2010/0046498 | A1 | 2/2010 | Hall | 370/350 |
| 2010/0054207 | A1 | 3/2010 | Gupta et al. | 370/331 |
| 2010/0056136 | A1 | 3/2010 | Zhu | 455/426.1 |
| 2010/0061326 | A1 | 3/2010 | Lee et al. | 370/329 |
| 2010/0098135 | A1 | 4/2010 | Eitan | 375/141 |
| 2010/0137025 | A1 | 6/2010 | Tal et al. | 455/553.1 |
| 2010/0191613 | A1 | 7/2010 | Raleigh | 705/26 |
| 2010/0197235 | A1 | 8/2010 | Wilhelmsson | 455/63.3 |
| 2010/0227639 | A1 | 9/2010 | Kim et al. | 455/525 |
| 2011/0136497 | A1 | 6/2011 | Youtz et al. | 455/452.2 |
| 2011/0149920 | A1 | 6/2011 | Liu et al. | 370/336 |
| 2011/0235612 | A1 | 9/2011 | Abeta et al. | 370/329 |
| 2011/0235621 | A1 | 9/2011 | Ko et al. | 370/338 |
| 2011/0237266 | A1 | 9/2011 | Cai | 455/450 |
| 2011/0243047 | A1 | 10/2011 | Dayal et al. | 370/311 |
| 2011/0256834 | A1 | 10/2011 | Dayal et al. | 455/67.7 |
| 2012/0020229 | A1 | 1/2012 | Dayal et al. | 370/252 |
| 2012/0082077 | A1 | 4/2012 | Zhang et al. | 370/311 |
| 2012/0113884 | A1 | 5/2012 | Park et al. | 370/312 |
| 2012/0207040 | A1 | 8/2012 | Comsa et al. | 370/252 |
| 2012/0218964 | A1 | 8/2012 | Park et al. | 370/329 |
| 2012/0230252 | A1 | 9/2012 | Yang | 370/328 |
| 2012/0269172 | A1 | 10/2012 | Chin et al. | 370/332 |
| 2013/0090142 | A1 | 4/2013 | Lee et al. | 455/501 |

FOREIGN PATENT DOCUMENTS

| | | |
|---|---|---|
| CN | 101141155 A | 3/2008 |
| CN | 101361279 A | 2/2009 |
| CN | 101365249 A | 2/2009 |
| CN | 101431808 A | 5/2009 |
| CN | 101553054 A | 10/2009 |
| CN | 101640565 A | 2/2010 |
| CN | 101677290 A | 3/2010 |
| CN | 101742526 A | 6/2010 |
| CN | 101848058 A | 9/2010 |
| EP | 2107839 | 10/2009 |
| EP | WO2010054364 A1 | 5/2010 |
| JP | 2001128237 | 5/2001 |
| JP | 2006279943 | 10/2006 |
| JP | 2008235978 | 10/2008 |
| JP | 2009500988 | 1/2009 |
| JP | 200965307 | 3/2009 |
| JP | 2009512244 | 3/2009 |
| JP | 2010038348 | 2/2010 |
| WO | WO2005020518 A1 | 3/2005 |
| WO | WO2005117473 | 12/2005 |
| WO | WO2007036686 | 4/2007 |
| WO | WO2007143352 | 12/2007 |
| WO | WO2008078311 | 7/2008 |
| WO | WO2009127690 | 10/2009 |
| WO | WO2010002219 A2 | 1/2010 |
| WO | WO2010025678 | 3/2010 |
| WO | WO2010027208 A2 | 3/2010 |
| WO | WO2010073325 | 7/2010 |
| WO | WO2011123555 | 10/2011 |

OTHER PUBLICATIONS

International Search Report and Written Opinion of International Search Authority for PCT/CN2011/078368 dated Nov. 3, 2011 (13 pages).
R2-103644 3GPP TSG-RAN WG2 Meeting #70bis, MediaTek, Discussion on In-device Coexistence Interference Avoidance, Jun. 28-Jul. 2, 2010, Stockholm, Sweden (3 pages).
International Search Report and Written Opinion of International Search Authority for PCT/CN2011/078377 dated Nov. 17, 2011 (11 pages).
International Search Report and Written Opinion of International Search Authority for PCT/CN2011/081042 dated Feb. 2, 2012 (10 pages).
International Search Report and Written Opinion of International Search Authority for PCT/CN2011/080479 dated Jan. 19, 2012 (12 pages).
The EPO has prepared the Search Report for the EP patent application 11833858 dated Apr. 24, 2013 (13 pages).
The SIPO has prepared the Examination Opinion for the Chinese patent application 201180003269.X dated Jun. 3, 2013 (11 pages).
The SIPO has prepared the Examination Opinion for the Chinese patent application 201180002307.X dated Jun. 21, 2013 (9 pages).
The USPTO has prepared the Office Action of related U.S. Appl. No. 13/134,876 dated Jun. 13, 2013 (26 pages).
The USPTO has prepared the Office Action of related U.S. Appl. No. 13/136,862 dated Jun. 24, 2013 (33 pages).
3GPP R2-106004 TR 36.816 Vo.2.0, 3rd Generation Partnership Project; Technical Specification Group Radio Access Networks; Evolved Universal Terrestrial Radio Access (E-UTRA); Study on Signaling and Procedure foe Interference Avoidance for In-Device Coexistence; Release 10 (12 pages).
3GPP TSG-RAN WG2#71bis R2-105712, Motorola; Solution Directions for LTE-ISM Coexistence; Xi'an, China, Oct. 11-15, 2010 (6 pages).
3GPP TSG-RAN WG2 Meeting#71bis R2-105587, Huawei HiSilicon; Consideration on the Details of In-Device Interference; Xi'an, China, Oct. 11-15, 2010 (4 pages).
3GPP TSG RAN WG2 Meeting#71bis R2-105336, CATT; FDM-based Approach for In-Device Coexistence Interference; Xi'an, China, Oct. 11-15, 2010 (2 pages).
3GPP TSG-RAN WG2 Meeting#71bis R2-105673, CMCC; Discussion on Moving LTE Signal Away from ISM Band for In-Device Coexistence; Xi'an, China, Oct. 11-15, 2010 (4 pages).
H 3GPP TSG RAN WG2#71 R2-104444, MediaTek; Analysis in In-Device Coexistence Interference Avoidance; Madrid, Spain, Aug. 23-27, 2010 (10 pages).
USPTO, office action of related U.S. Appl. No. 13/317,524 dated Aug. 21, 2013 (17 pages).
USPTO, office action of related U.S. Appl. No. 13/136,862 dated Oct. 7, 2013 (26 pages).
JP Office Action for JP applicant 2013-514543 dated Jan. 28, 2014 (7 pages).
JP Office Action for JP applicant 2013-534155 dated Feb. 4, 2014 (2 pages).
JP Office Action for JP applicant 2013-523483 dated Feb. 18, 2014 (4 pages).

(56) References Cited

OTHER PUBLICATIONS

JP Office Action for JP applicant 2013-530554 dated Mar. 14, 2014 (4 pages).
JPO Office Action of JP patent application 2013-520958 dated Mar. 4, 2014 (4 pages).
Taiwan IPO Office Action of TW patent application 100128825 dated Mar. 21, 2014 (5 pages).
JPO Office Action of JP patent application 2013-530554 dated Apr. 1, 2014 (4 pages).
USPTO Office Action of related U.S. Appl. No. 13/136,861 dated May 23, 2014 (12 pages).
EPO, Search Report for the EP application 11816122.3 dated Oct. 21, 2014 (8 pages).
"Information technology—Telecommunications and information exchange between systems—Local and Metropolitan area networks—Specific requirements—Part 11: Wireless LAN Medium Access Control (MAC) and Physical Layer (PHY) Specifications", (Jan. 1, 2003), IEEE Standard; [IEEE Standard], IEEE, Piscataway, NJ, USA, * pp. 3-8, * pp. 72-73.
EPO, Search Report for the EP application 11795201.0 dated Dec. 18, 2014 (8 pages).
EPO, Search Report for the EP application 11828151.8 dated Feb. 9, 2015 (9 pages).
R2-103644, 3GPP TSG-RAN WG2 Meeting #70bis; MediaTek; Discussion on In-Device Coexistence Interference Avoidance; Jun. 28-Jul. 2, 2010 (3 pages).
USPTO, Office Action for related U.S. Appl. No. 13/136,861 dated Mar. 31, 2015 (16 pages).
USPTO, Office Action for related U.S. Appl. No. 14/200,398 dated Apr. 7, 2015 (11 pages).
USPTO, Office Action for related U.S. Appl. No. 14/263,166 dated Apr. 30, 2015 (23 pages).
USPTO, Office Action for related U.S. Appl. No. 14/967,565 dated Jan. 29, 2016 (14 pages).
JPO, Office Action for the JP patent application 2015-083514 dated Jun. 28, 2016 (20 pages).
3GPP TSG-RAN WG2#71bis R2-105712, Motorola, Solution Directions for LTE-ISM Coexistence, Xi'an, China dated Oct. 11-15, 2010 (6 pages).
3GPP TR 36.816 V0.2.0 (Oct. 2010), 3rd Generation Partnership Project; Technical Specification Group Radio Access Networks; Evolved Universal terrestrial Radio Access (E-UTRA); Study on signaling and procedure for interference avoidance for in-device coexistence; (release 10), (R2-106004).

METHOD OF TDM IN-DEVICE COEXISTENCE INTERFERENCE AVOIDANCE

CROSS REFERENCE TO RELATED APPLICATIONS

This application is a continuation, and claims priority under 35 U.S.C. §120 from nonprovisional U.S. patent application Ser. No. 13/200,775, entitled "Method of TDM In-Device Coexistence Interference Avoidance," filed on Sep. 29, 2011, the subject matter of which is incorporated herein by reference. Application Ser. No. 13/200,775 was issued on Jul. 15, 2014 as U.S. Pat. No. 8,780,880. Application Ser. No. 13/200,775, in turn, claims priority under 35 U.S.C. §119 from U.S. Provisional Application No. 61/388,687, entitled "Method of TDM In-Device Coexistence Interference Avoidance," filed on Oct. 1, 2010, the subject matter of which is incorporated herein by reference.

TECHNICAL FIELD

The disclosed embodiments relate generally to wireless network communications, and, more particularly, to TDM solutions for in-device coexistence (IDC) interference avoidance.

BACKGROUND

Ubiquitous network access has been almost realized today. From network infrastructure point of view, different networks belong to different layers (e.g., distribution layer, cellular layer, hot spot layer, personal network layer, and fixed/wired layer) that provide different levels of coverage and connectivity to users. Because the coverage of a specific network may not be available everywhere, and because different networks may be optimized for different services, it is thus desirable that user devices support multiple radio access networks on the same device platform. As the demand for wireless communication continues to increase, wireless communication devices such as cellular telephones, personal digital assistants (PDAs), smart handheld devices, laptop computers, tablet computers, etc., are increasingly being equipped with multiple radio transceivers. A multiple radio terminal (MRT) may simultaneously include a Long-Term Evolution (LTE) or LTE-Advanced (LTE-A) radio, a Wireless Local Area Network (WLAN, e.g., WiFi) access radio, a Bluetooth (BT) radio, and a Global Navigation Satellite System (GNSS) radio.

Due to spectrum regulation, different technologies may operate in overlapping or adjacent radio spectrums. For example, LTE/LTE-A TDD mode often operates at 2.3-2.4 GHz, WiFi often operates at 2.400-2.483.5 GHz, and BT often operates at 2.402-2.480 GHz. Simultaneous operation of multiple radios co-located on the same physical device, therefore, can suffer significant degradation including significant coexistence interference between them because of the overlapping or adjacent radio spectrums. Due to physical proximity and radio power leakage, when the transmission of signal for a first radio transceiver overlaps with the reception of signal for a second radio transceiver in time domain, the second radio transceiver reception can suffer due to interference from the first radio transceiver transmission. Likewise, signal transmission of the second radio transceiver can interfere with signal reception of the first radio transceiver.

Figure 1:
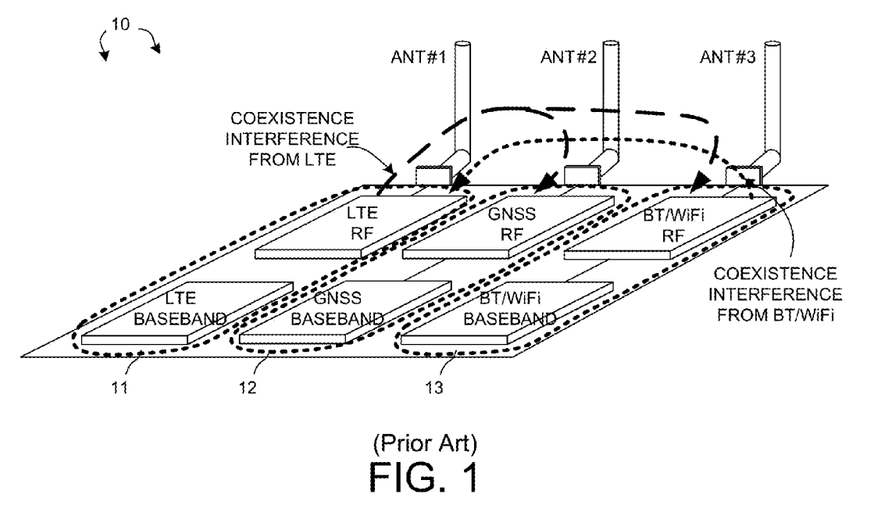
FIG. 1 (Prior Art) is a diagram that illustrates interference between an LTE transceiver and a co-located WiFi/BT transceiver and GNSS receiver.

FIG. 1 (Prior Art) is a diagram that illustrates interference between an LTE transceiver and a co-located WiFi/BT transceiver and GNSS receiver. In the example of FIG. 1, user equipment (UE) 10 is an MRT comprising an LTE transceiver 11, a GNSS receiver 12, and a BT/WiFi transceiver 13 co-located on the same device platform. LTE transceiver 11 comprises an LTE baseband module and an LTE RF module coupled to an antenna #1. GNSS receiver 12 comprises a GNSS baseband module and a GNSS RF module coupled to antenna #2. BT/WiFi transceiver 13 comprises a BT/WiFi baseband module and a BT/WiFi RF module coupled to antenna #3. When LTE transceiver 11 transmits radio signals, both GNSS receiver 12 and BT/WiFi transceiver 13 may suffer coexistence interference from LTE. Similarly, when BT/WiFi transceiver 13 transmits radio signals, both GNSS receiver 12 and LTE transceiver 11 may suffer coexistence interference from BT/WiFi. How UE10 can simultaneously communicate with multiple networks through different transceivers and avoid/reduce coexistence interference is a challenging problem.

Figure 2:
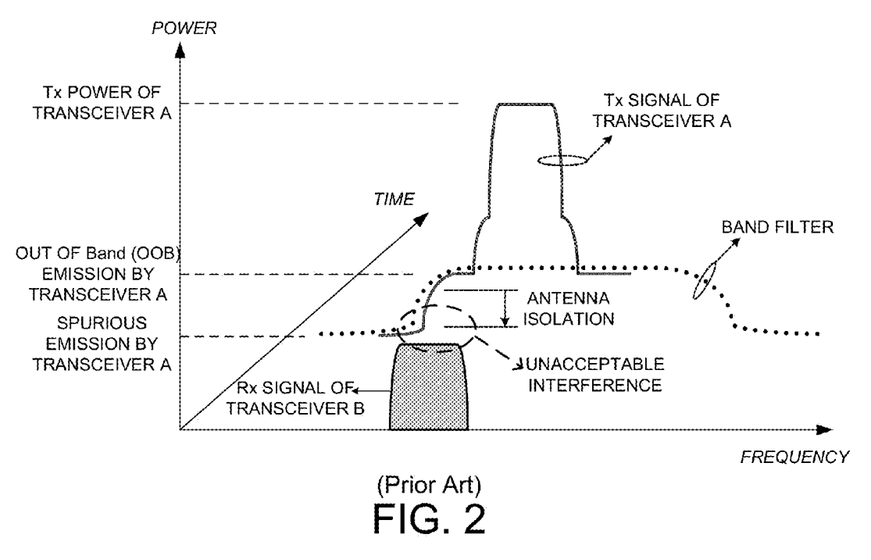
FIG. 2 (Prior Art) is a diagram that illustrates the signal power of radio signals from two co-located RF transceivers in a same device platform.

FIG. 2 (Prior Art) is a diagram that illustrates the signal power of radio signals from two co-located RF transceivers. In the example of FIG. 2, transceiver A and transceiver B are co-located in the same device platform (i.e., in-device). The transmit (TX) signal by transceiver A (e.g., WiFi TX in ISM CH1) is very close to the receive (RX) signal (e.g., LTE RX in Band 40) for transceiver B in frequency domain. The out of band (OOB) emission and spurious emission resulted by imperfect TX filter and RF design of transceiver A may be unacceptable to transceiver B. For example, the TX signal power level by transceiver A may be still higher (e.g. 60 dB higher before filtering) than RX signal power level for transceiver B even after the filtering (e.g., after 50 dB suppression).

In addition to imperfect TX filter and RF design, imperfect RX filter and RF design may also cause unacceptable in-device coexistence interference. For example, some RF components may be saturated due to transmit power from another in-device transceiver but cannot be completely filtered out, which results in low noise amplifier (LNA) saturation and cause analog to digital converter (ADC) to work incorrectly. Such problem actually exists regardless of how much the frequency separation between the TX channel and the RX channel is. This is because certain level of TX power (e.g., from a harmonic TX signal) may be coupled into the RX RF frontend and saturate its LNA. If the receiver design does not consider such coexistence interference, the LNA may not be adapted at all and keep saturated until the coexistence interference be removed (e.g. by turning off the interference source).

Various in-device coexistence (IDC) interference avoidance solutions have been proposed. For example, an UE may request network assistance to prevent IDC interference via frequency division multiplexing (FDM), time division multiplexing (TDM), and/or power management principles. The major concerns on TDM solutions are how much complexity to eNB scheduler, how UE can help eNB generate proper gaps, how UE can utilize the gaps generated by eNB, how much performance improvement can be achieved, and how much impact to the existing LTE/LTE-A standard specifications. Possible TDM solutions include DRX/DTX, measurement, SPS, MBMS, scheduling via PDCCH, and a new protocol. It is desirable to find a TDM solution that can generate the TX/RX gaps with more flexibility and less impact to existing design and implementation.

SUMMARY

A method of TDM in-device coexistence (IDC) interference avoidance is proposed. In a wireless communication device, a first radio module is co-located with a second radio module in the same device platform. The first radio module obtains traffic and scheduling information of the second radio module. The first radio module then determines a desired TDM pattern based on the traffic and scheduling information to prevent IDC interference with the second radio module. The first radio module also transmits TDM coexistence pattern information based on the desired TDM pattern to a base station (eNB). In one embodiment, the TDM coexistence pattern information comprises a recommended TDM pattern periodicity and a scheduling period to maximize IDC efficiency subject to limited level of IDC interference possibility.

In one specific example, the TDM coexistence pattern information comprises a set of discontinuous reception (DRX) configuration parameters defined in 3GPP long-term evolution (LTE) standards. If the second radio module is a WiFi radio having WiFi beacon signal periodicity of 102.4 ms, then the eNB configures DRX operation with a longDRX-Cycle equal to 128 ms or 64 ms, and the OnDurationTimer is small enough such that collision probability between the first and the second radio modules is lower than a threshold value. Upon receiving an IDC interference indication, the eNB may restrict some flexible extension of an ON duration within each DRX cycle to further reduce collision probability.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 3:
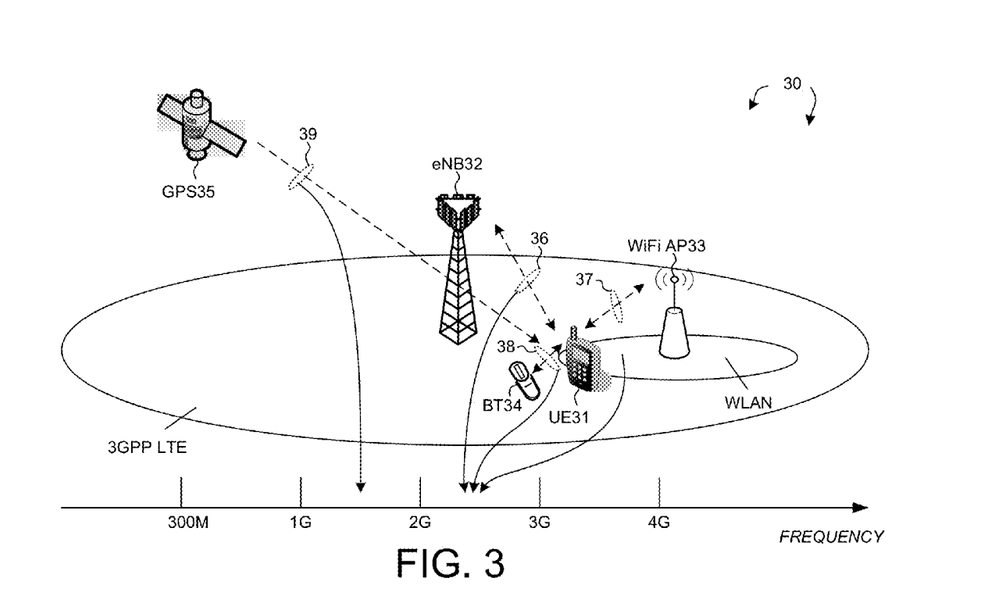
FIG. 3 illustrates a user equipment having multiple radio transceivers in a wireless communication system in accordance with one novel aspect.

FIG. 3 illustrates a user equipment UE31 having multiple radio transceivers in a wireless communication system 30 in accordance with one novel aspect. Wireless communication system 30 comprises a user equipment UE31, a serving base station (e.g., evolved node-B) eNB32, a WiFi access point WiFi AP33, a Bluetooth device BT34, and a global positioning system satellite device GPS35. Wireless communication system 30 provides various network access services for UE31 via different radio access technologies. For example, eNB32 provides OFDMA-based cellular radio network (e.g., a 3GPP Long-Term Evolution (LTE) or LTE-Advanced (LTE-A) system) access, WiFi AP33 provides local coverage in Wireless Local Area Network (WLAN) access, BT34 provides short-range personal network communication, and GPS35 provides global access as part of a Global Navigation Satellite System (GNSS). To access various radio networks, UE31 is a multi-radio terminal (MRT) that is equipped with multiple radios coexisted/co-located in the same device platform (i.e., in-device).

Due to spectrum regulation, different radio access technologies may operate in overlapping or adjacent radio spectrums. As illustrated in FIG. 3, UE31 communicates radio signal 36 with eNB32, radio signal 37 with WiFi AP33, radio signal 38 with BT34, and receives radio signal 39 from GPS35. Radio signal 36 belongs to 3GPP Band 40, radio signal 37 belongs to one of the WiFi channels, and radio signal 38 belongs to one of the seventy-nine Bluetooth channels. The frequencies of all those radio signals fall within a range from 2.3 GHz to 2.5 GHz, which may result in significant in-device coexistence (IDC) interference to each other. The problem is more severe around the 2.4 GHz ISM (The Industrial, Scientific and Medical) radio frequency band. Various IDC interference avoidance solutions have been proposed. In one novel aspect, UE31 triggers specific Time Division Multiplexing (TDM)-based solutions for IDC interference avoidance. The TDM-based solutions require internal device coordination, such as a central control entity that communicates with the multiple radios within UE31.

Figure 4:
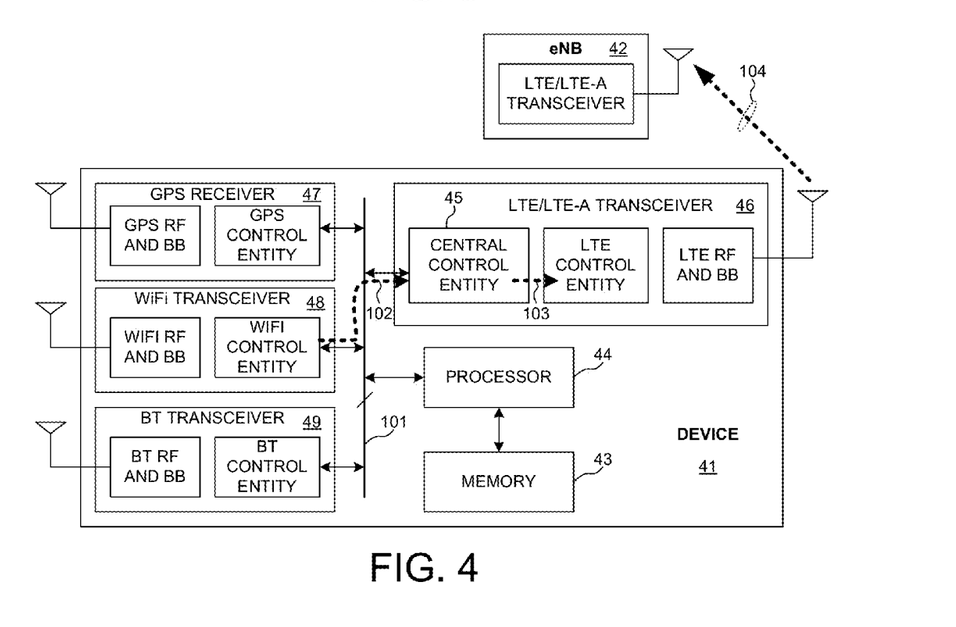
FIG. 4 is a simplified block diagram of a wireless device having a central control entity.

FIG. 4 is a simplified block diagram of a wireless device 41 having a central control entity to facilitate TDM solutions for IDC interference avoidance. Wireless device 41 comprises memory 43, a processor 44, a central control entity 45, an LTE transceiver 46, a GPS receiver 47, a WiFi transceiver 48, a Bluetooth transceiver 49, and bus 101. In the example of FIG. 4, central control entity 45 is a logical entity physically implemented within the LTE transceiver 46. Alternatively, central control entity 45 can be a logical entity implemented within a processor that is physically located within WiFi transceiver 48, BT transceiver 49, or processor 44 that is also used for device application processing for device 41. Central control entity 45 is connected to various transceivers within device 41, and communicates with the various transceivers via bus 101.

For example, WiFi transceiver 48 transmits WiFi signal information and/or WiFi traffic and scheduling information to central control entity 45 (e.g., depicted by a dotted line 102). Based on the received WiFi information, central control entity 45 determines control information and transmits the control information to LTE transceiver 46 (e.g., depicted by a dotted line 103). In one embodiment, LTE transceiver 46 learns the WiFi activity through control entity 45 and detects IDC interference between LTE and WiFi. LTE transceiver 46 triggers TDM solution for IDC interference avoidance and communicates with its serving base station eNB42 to indicate a recommended TDM coexistence pattern (e.g., depicted by a dotted line 104). Based on the TDM coexistence pattern information, eNB42 is able to determine the best suitable TDM solution for device 41 to prevent IDC interference between LTE and WiFi effectively.

Figure 5:
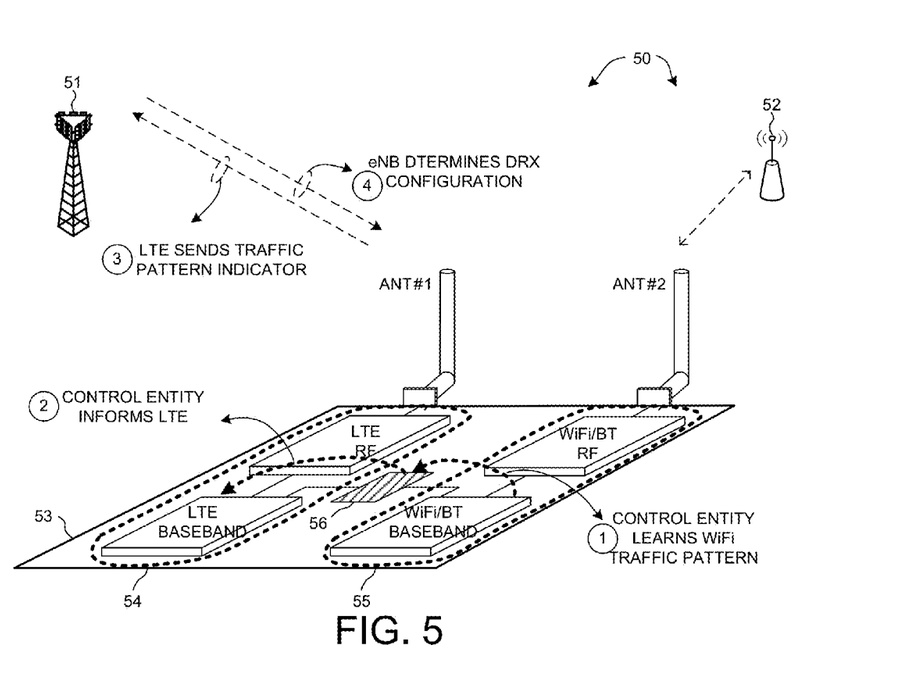
FIG. 5 illustrates one embodiment of TDM solution for IDC interference avoidance in accordance with one novel aspect.

FIG. 5 illustrates one embodiment of TDM solution for IDC interference avoidance in wireless network 50 in accordance with one novel aspect. Wireless network 50 comprises an eNB51, a WiFi AP52, and an UE53. UE53 comprises an LTE radio module (e.g., transceiver) 54, an ISM BT/WiFi radio module (e.g., transceiver) 55, and a central control entity 56. In one novel aspect, control entity 56 learns ISM Tx/Rx activity from BT/WiFi transceiver 55 (step 1) and informs the ISM Tx/Rx timing information to LTE transceiver 54 (step 2). Based on the ISM Tx/Rx timing information, LTE radio module 54 triggers IDC interference avoidance mechanism and indicates a recommended coexistence pattern to eNB51 (step 3). In addition, LTE radio module 54 may also reports ISM traffic and scheduling information to eNB51 to further assist IDC configuration. Based on the received coexistence pattern information, eNB51 determines the best suitable TDM solution for UE53 to prevent IDC interference (step 4). In one specific embodiment, eNB51 configures UE53 with discontinuous reception (DRX) operation that controls the ON/OFF cycle and Tx/Rx activity of UE53 by configuring a set of DRX parameters.

Figure 6:
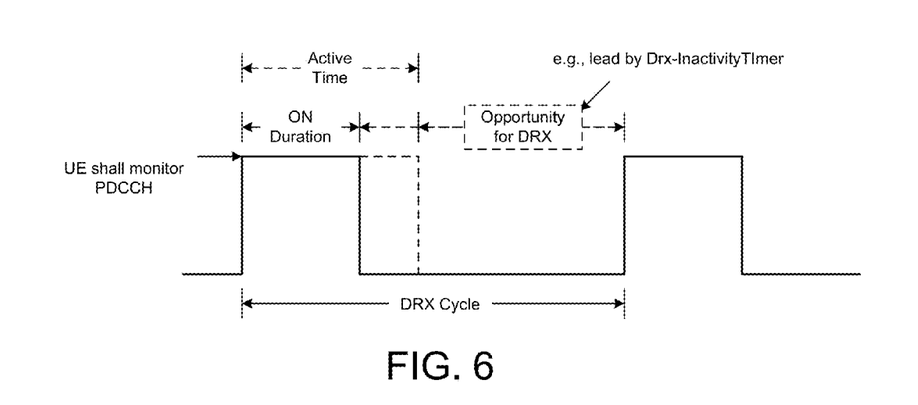
FIG. 6 illustrates a basic DRX cycle and corresponding DRX configuration parameters.

FIG. 6 illustrates a basic DRX cycle and corresponding DRX configuration parameters. A basic DRX cycle consists of an ON Duration (e.g., sometimes referred to as a scheduling period) and an Opportunity for DRX Duration. In RRC_CONNECTED mode, if DRX operation is configured on a UE, then the UE is allowed to monitor the Physical Downlink Control Channel (PDCCH) discontinuously using the DRX operation. In general, the UE shall monitor the PDCCH during the ON Duration, and may stop monitoring the PDCCH during the Opportunity for DRX Duration. While the DRX cycle length and the On Duration are fixed under a certain DRX configuration, the Active Time (i.e., the duration when the UE is active for possible RX and TX) is extendable from the ON Duration, which may happen during the Opportunity for DRX Duration period. A DRX cycle is controlled via radio resource control (RRC) layer messaging by configuring onDurationTimer, drx-InactivityTimer, drx-RetransmissionTimer, the longDRX-Cycle, the value of the drxStartOffset, and optionally the drxShortCycleTimer and shortDRX-Cycle.

When a DRX cycle is configured, the Active Time in each DRX cycle varies, depending on the configured DRX parameters. The Active Time is extendable from the ON Duration based on the following four conditions. First, the Active Time includes the time while onDurationTimer or drx-InactivityTimer or macContentionResolutionTimer is running. Second, the Active Timer includes the time while a Scheduling Request is sent on PUCCH and the Scheduling Request is pending. Third, the Active Time includes the time while an uplink grant for a pending HARQ retransmission can occur and there is data in the corresponding HARQ buffer. Fourth, the Active Time includes the time while a PDCCH indicating a new transmission addressed to the C-RNTI of the UE has not been received after successful reception of a Random Access Response for the preamble not selected by the UE. If any of the four conditions is met, the Active Time is extended from the ON Duration.

Figure 7:
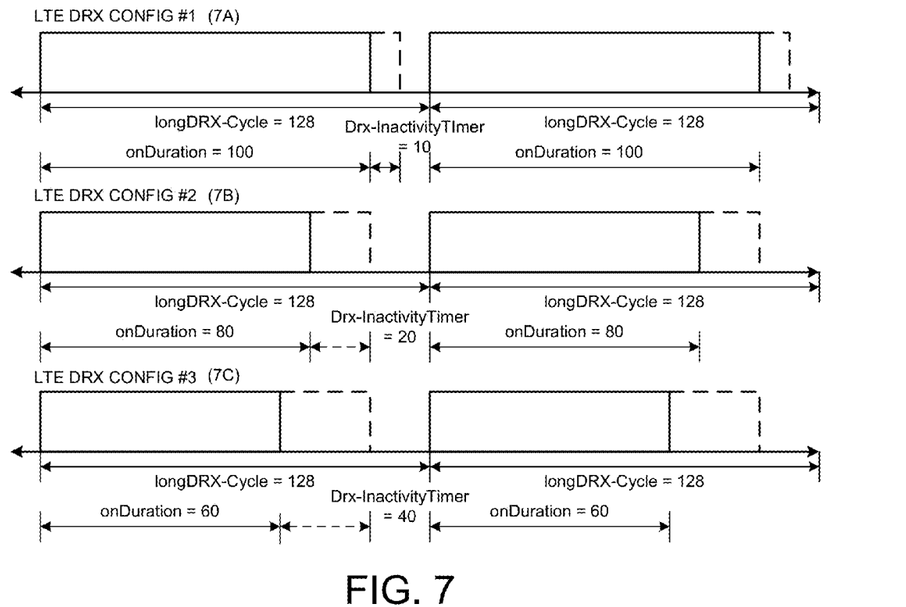
FIG. 7 illustrates examples of LTE DRX traffic patterns with different DRX configuration parameters.

FIG. 7 illustrates examples of LTE DRX traffic patterns with different DRX configuration parameters. In the example of FIG. 7, all three DRX traffic patterns have a longDRX-Cycle equal to 128 ms. The onDuration parameter, however, is different in different DRX configuration. Under DRX CONFIG#1, traffic pattern (7A) has an onDurationTimer equal to 100 ms, with DRX-InactivityTimer set to 10 ms. Under DRX CONFIG#2, traffic pattern (7B) has an onDurationTimer equal to 80 ms, with Drx-InactivityTimer set to 20 ms. Under DRX CONFIG#3, traffic pattern (7C) has an onDurationTimer equal to 60 ms, with DRX-InactivityTimer set to 40 ms. It can be seen that even under the same DRX duty cycle, the UE may have different ON Duration with different onDurationTimer. Furthermore, the DRX-InactivityTimer can keep the UE stay in Active Time and equivalently extend the ON Duration (i.e., which may happen during the Opportunity for DRX Duration period). Therefore, DRX protocol supports good flexibility on configuration, and different parameter values can lead to various gap patterns in time domain. As a result, DRX protocol may function as a good TDM solution for IDC interference avoidance.

The principle of TDM solution for coexistence system is for eNB to have maximum scheduling flexibility while avoiding coexistence interference by reducing time overlap between LTE and ISM traffic. Therefore, in one example, under TDM solution, the general objective function for coexistence systems is:

$$\text{Maximize \{Coexistence Efficiency\} subject to}$$
$$\{P_C < P_{C\_REQ}\} \quad (1)$$

where
- Coexistence Efficiency (CE)=(Duration that eNB can grant resources for LTE TX/RX)/(Observation Time)
- Probability to Collide ($P_C$)=[Duration that eNB can grant resources for LTE TX/RX while ("ISM transceiver can RX/TX" or "GNSS receiver can RX")+extension factor]/(Observation Time)
- $P_{C\_REQ}$=the required threshold value of $P_C$.

Coexistence efficiency (CE) is associated with eNB scheduling flexibility. Higher CE means eNB have more time to possibly schedule data transmission or reception to UE. Probability to collide ($P_C$) means the level of possibility that coexistence interference may happen. The real collision probability further considers the probability that eNB schedules DL/UL grant and the probability that ISM system schedules UL/DL grant or the probability that GNSS system performs DL reception. Because the LTE sub-frame boundary may not be 100% aligned with ISM or GNSS system, additional probability to collide may be increased due to converting the problem into an integer-programming problem. In addition, the extension factor is introduced in this example to capture the variation of the DRX boundary condition, which is a positive value and thus may further increase the probability to collide.

From LTE perspective, the general objective for coexistence systems is to maximize eNB scheduling flexibility (e.g., a function of CE) while limit coexistence interference probability (e.g., a function of $P_C$) to be less than a required threshold $P_{C\_REQ}$. $P_{C\_REQ}$ may be defined based on the traffic pattern and QoS requirements associated with ISM transceiver or GNSS receiver. In one example, $P_{C\_REQ}$ may be 10% for voice traffic based on affordable QoS degradation allowed by user. In another example, $P_{C\_REQ}$ REQ may be 0% for critical system information to be exchanged by ISM transceiver (e.g., WiFi beacon or BT initial connection setup).

Figure 8:
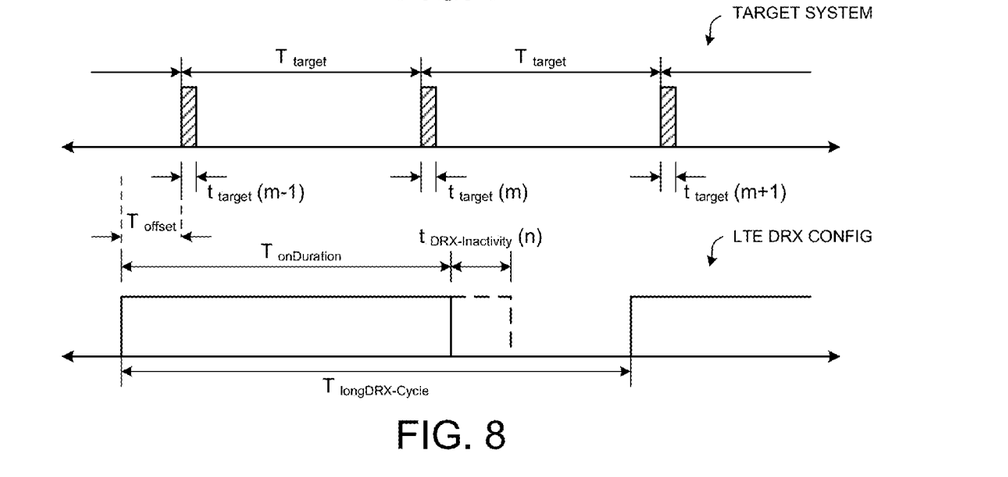
FIG. 8 illustrates traffic pattern and scheduling parameters of an LTE system and an ISM target system for coexistence problems.

FIG. 8 illustrates traffic pattern and scheduling parameters of an LTE system and an ISM target system for coexistence problems. Assume that periodic radio signals are transmitted in the ISM target system (e.g., WiFi Beacon), and that DRX operation is enabled in the LTE system. The following traffic scheduling parameters are illustrated in FIG. 8:

$T_{target}$: Periodicity of the signal transmitted in target system $t_{transmit}(m)$: Transmission time over m-th transmission $T_{onDuration}$: onDurationTimer configured by eNB $T_{longDRx-Cycle}$: longDRx-Cycle configured by eNB $t_{DRX-Inactivity}(n)$: Extended onDuration time by DRX-Inactivity timer in n-th DRX cycle $T_{offset}$: time offset between $1^{st}$ DRX cycle start point and the incoming signal in target system Based on the above-illustrated traffic scheduling parameters, both coexistence efficiency (CE) and probability to collide ($P_C$) can be calculated. As a result, the best suitable DRX configuration parameters can be determined by the eNB to satisfy the general objective of function (1), under the assumption that the eNB knows the exact signal transmission timing and periodicity of the target system.

It is, however, a difficult task to achieve the general objective function (1). First, the eNB typically does not know the traffic scheduling parameters of the target system and thus will not be able to determine the best DRX configuration parameters. Second, the traffic scheduling parameters of the target system may be complicated and unpredictable. To address the first issue, the eNB needs to rely on the UE with in-device coordination capability to recommend preferred DRX configuration. Referring back to FIG. 5, for example, eNB 51 relies on the coexistence pattern information sent from LTE radio module 54 to determine the preferred DRX configuration parameters. To address the second issue, simplified periodic traffic patterns such as the WiFi beacon signal may be used as a starting point to investigate potential DRX-based solutions for coexistence problems.

Figure 9:
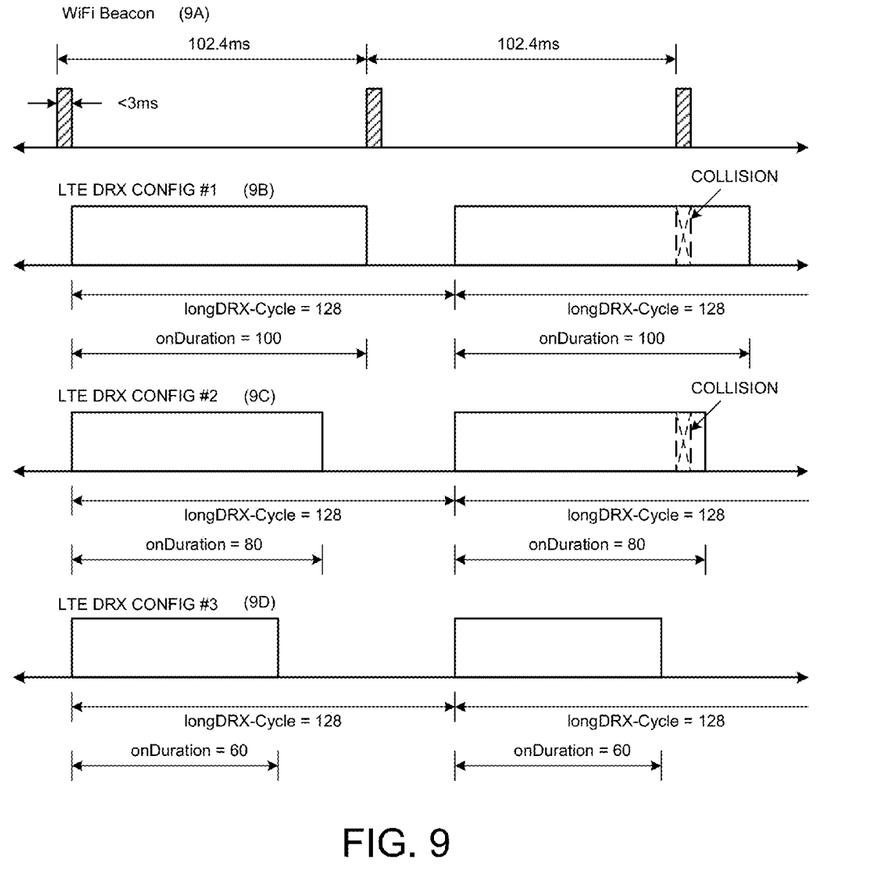
FIG. 9 illustrates examples of various LTE DRX configurations that coexist with WiFi Beacon.

FIG. 9 illustrates examples of various LTE DRX configurations that coexist with WiFi Beacon. In the example of FIG. 9, the WiFi Beacon traffic pattern (9A) has a signal periodicity of 102.4 ms, and the WiFi beacon signal transmission duration is less than 3 ms in general. For LTE DRX CONFIG#1, traffic pattern (9B) has a longDRX-Cycle of 128 ms, and an onDuration=100 ms. For LTE DRX CONFIG#2, traffic pattern (10C) has a longDRX-Cycle of 128 ms, and an onDuration=80 ms. For LTE DRX CONFIG#3, traffic pattern (10D) has a longDRX-Cycle of 128 ms, and an onDuration=60 ms. Assume that the first LTE DRX cycle boundary has been aligned with the WiFi beacon. If $t_{WiFi\_Rx}$ denotes the time to receive WiFi beacons, and $t_{LTE\_Tx}$ denotes the time to have possible LTE UL TX, and x denotes the longDRX-Cycle, then we have:

$$\text{Coexistence Efficiency } CE = \text{Sum}(t_{LTE\_Tx})/[102,4,x] \quad (2)$$

$$\text{Probability to Collide } P_C = \text{Probability} \\ (t_{WiFi\_Rx} = t_{LTE\_Tx}) \quad (3)$$

To satisfy the general objective as defined by function (1), the coexistence efficiency (CE) will be increased if $t_{LTE\_TX}$ is increased. On the other hand, the probability to collide $P_C$ that the WiFi beacon will collide with LTE TX will also be increased if $t_{LTE\_TX}$ is increased. Although changing $t_{LTE\_TX}$ may result in contradictory performance, it is still possible to find the best tradeoff. As illustrated in FIG. 9, when the onDuration is decreased to 60 ms, there is less collision between the WiFi beacon and possible LTE traffic. Therefore, it is possible to determine which DRX configuration parameters can provide the best solution to avoid IDC interference between LTE and WiFi beacon.

Figure 10:
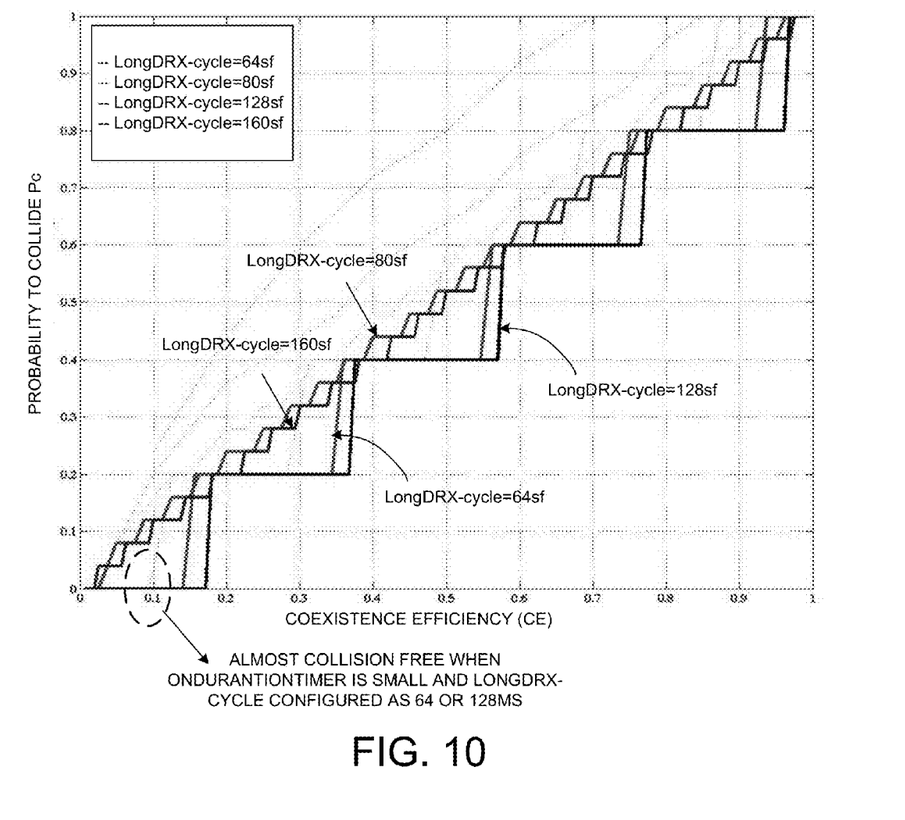
FIG. 10 is a simulation diagram of Probability to Collide vs. Coexistence Efficiency under different DRX configuration parameters.

FIG. 10 is a simulation diagram of Probability to Collide vs. Coexistence Efficiency under different DRX configuration parameters. The simulation considers that the LTE eNB can configure DRX parameters for UE to perform coexistence interference avoidance with WiFi beacon for in-device WiFi transceiver. The WiFi beacon periodicity is 102.4 ms, and the WiFi beacon transmission time is 1-3 ms. The DRX parameters to be controlled are the longDRX-Cycle and the onDurationTimer. It is assumed that the drx-InactivityTimer=1 ms, and no grant scheduled by eNB in the last subframe of the onDuration to reduce simulation complexity. At the system level, it is further assumed that the eNB knows WiFi beacon is the subject for coexistence, and the eNB knows the WiFi beacon transmission timing and periodicity.

From the simulation result in FIG. 10, it can be seen that good tradeoff between "probability to collide" and "coexistence efficiency" may be achieved by proper DRX configuration. More specifically, the DRX patterns with longDRX-Cycle=128 ms or 64 ms can lead to the best performance tradeoff. For example, if longDRX-Cycle=128, when onDurationTimer is small, e.g., when coexistence efficiency is less than 0.17, then the probability to collide is almost zero. Therefore, DRX-based solution is a feasible TDM solution for in-device coexistence interference avoidance.

In one advantageous aspect, the eNB may restrict flexible extension of the ON duration to reduce collision probability. Although DRX protocol supports extendable ON Duration (e.g., the four conditions described above with respect to FIG. 6), such extendibility may increase collision probability. This is because the in-device WiFi radio may put all traffic over the "Opportunity for DRX Duration" period to avoid the "ON Duration", serious collision may happen if the eNB flexibly extends the ON Duration based on those four conditions. It is thus proposed that at least one of the conditions is disabled (e.g., disable the drx-InactivityTimer) to restrict eNB flexibility and provide in-device radio more reliable protection. It should be noted that those condition(s) would only be disabled when UE indicates it has coexistence interference problem and will not be applied under normal scenario. In one example, a UE transmits an IDC interference indicator to the eNB when IDC interference is detected and IDC interference avoidance mechanism is triggered. Upon receiving the IDC interference indication, the eNB disables some of the conditions to restrict the flexible extension of the ON Duration. In another example, the UE transmits an indicator to the eNB to restrict the flexible extension of the DRX ON Duration once the UE detects IDC interference.

Other possible TDM solutions for IDC interference avoidance may include Semi-Persistent Scheduling (SPS), measurement gap, MBMS subframe, scheduling via PDCCH, and a new protocol. As compared to those solutions, DRX is the most promising solution because it is one of the existing protocols available in Rel-8/9 specification and is applicable for both RRC_Connected mode and RRC_Idel mode. Multiple DRX configuration parameter vales can lead to various gap patterns, to optimize coexistence efficiency and reduce probability to collide. In addition, if some modifications are allowed, the DRX is still the most promising solution because more parameters or additional values of existing parameters may be considered for higher efficiency.

Figure 11:
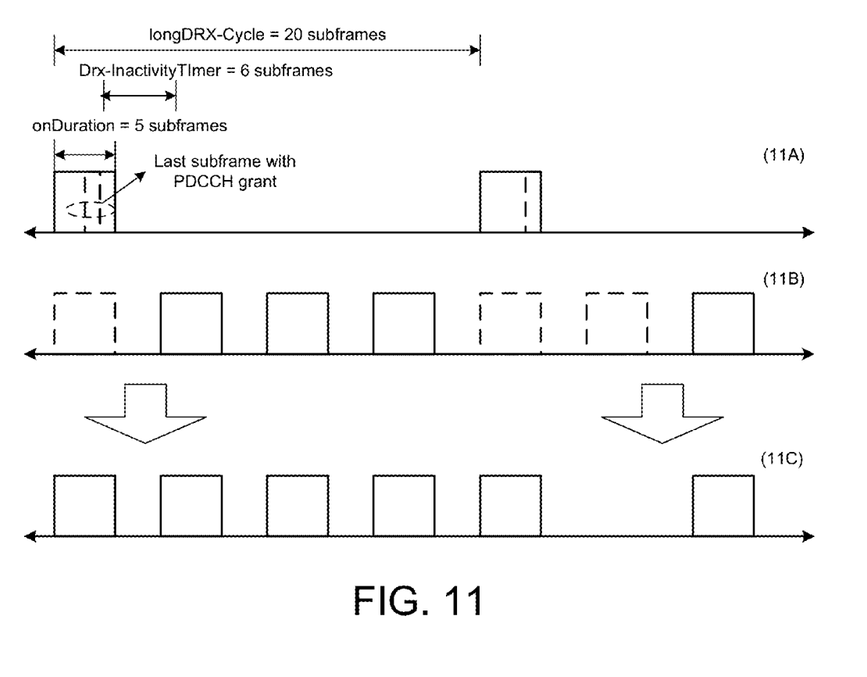
FIG. 11 illustrates possible modifications on existing DRX protocol.

FIG. 11 illustrates possible modifications on existing DRX protocol. Various traffic patterns can be generated by jointly utilizing longDRX-CycleStartOffset, onDuration-Timer, drx-InactivityTimer, and shortDRX-Cycle to configure gap pattern for coexistence. In addition, drx-InactivityTimer may help to further improve coexistence efficiency. In the example of FIG. 11, DRX traffic pattern (11A) is based on longDRX-CycleStartOffset and drx-InactivityTimer, DRX traffic pattern (11B) is based on shortDRX-Cycle, and DRX traffic pattern (11C) is based on based on longDRX-CycleStartOffset, drx-InactivityTimer, and shortDRX-Cycle.

Figure 12:
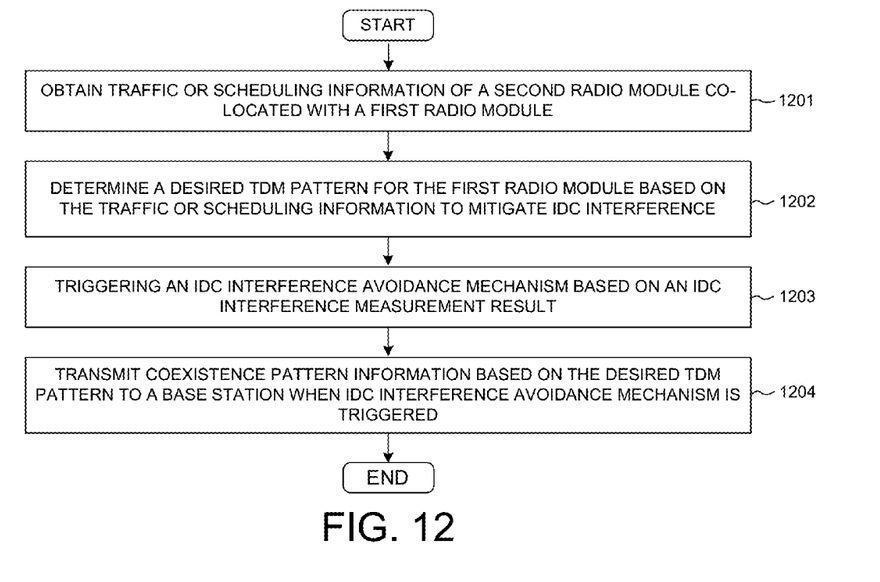
FIG. 12 is a flow chart of a method of TDM solution for IDC interference avoidance from UE perspective in accordance with one novel aspect.

FIG. 12 is a flow chart of a method of TDM solution for IDC interference avoidance from UE perspective in accordance with one novel aspect. A UE comprises a first radio module co-located with a second radio module in the same device platform. In step 1201, the first radio module obtains traffic or scheduling information of the second radio module. In step 1202, the first radio module determines a desired TDM pattern based on the traffic and scheduling information to mitigate IDC interference. In step 1203, the first radio module detects IDC interference based on interference measurement result and triggers interference avoidance mechanism. In step 1204, the first radio module transmits coexistence pattern information based on the desired TDM patter to a base station when IDC interference avoidance mechanism is triggered. The coexistence pattern information may comprises a recommended TDM pattern periodicity and a scheduling period to maximize IDC efficiency subject to limited level of IDC interference possibility.

Figure 13:
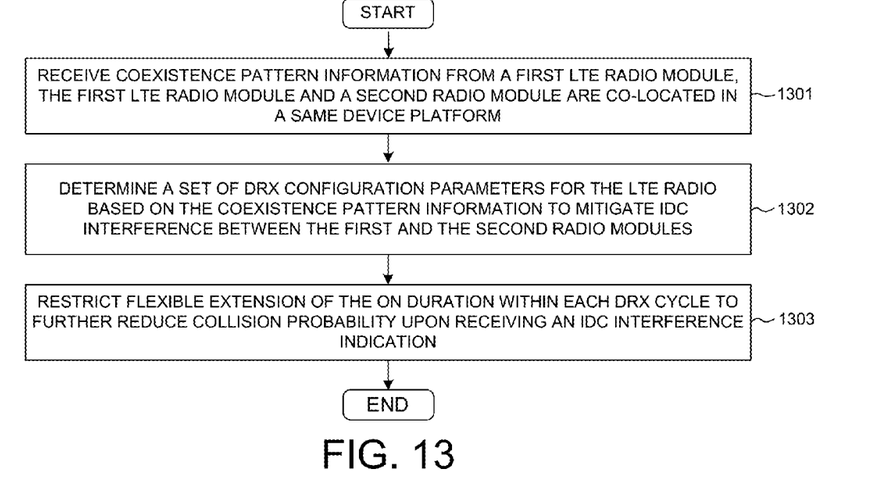
FIG. 13 is a flow chart of a method of TDM solution for IDC interference avoidance from eNB perspective in accordance with one novel aspect.

FIG. 13 is a flow chart of a method of TDM solution for IDC interference avoidance from eNB perspective in accordance with one novel aspect. In step 1301, the eNB receives coexistence pattern information from an LTE radio module co-located with a second radio module in a same device platform. In step 1302, the eNB determines a set of DRX configuration parameters for the LTE radio based on the received coexistence pattern information to mitigate IDC interference. In step 1303, the eNB restrict flexible extension of the ON Duration within each DRX cycle to further reduce collision probability once the eNB receives an IDC interference indication.

Although the present invention has been described in connection with certain specific embodiments for instructional purposes, the present invention is not limited thereto. For example, although an LTE/LTE-A or WiMAX mobile communication system is exemplified to describe the present invention, the present invention can be similarly applied to other mobile communication systems, such as Time Division Synchronous Code Division Multiple Access (TD-SCDMA) systems. Accordingly, various modifications, adaptations, and combinations of various features of the described embodiments can be practiced without departing from the scope of the invention as set forth in the claims.

What is claimed is:

1. A method comprising:
   obtaining, by a first radio module, traffic or scheduling information of a second radio module co-located with the first radio module in a wireless communication device;
   determining a desired time-division multiplexing (TDM) pattern for the first radio module based on the traffic or scheduling information to mitigate in-device coexistence (IDC) interference with the second radio module; and
   transmitting coexistence pattern information based on the desired TDM pattern to a base station, wherein the coexistence pattern information comprises a set of recommended discontinuous reception (DRX) configuration parameters and a recommended TDM pattern periodicity and a scheduling period, wherein the set of recommended DRX configuration parameters comprises an onDurationTimer, a DRX cycle, a DRX-Inactivity timer for onDuration extension.

2. The method of claim 1, wherein the coexistence pattern information comprises a time offset between a first DRX cycle start point and an incoming signal of the second radio module.

3. The method of 1, wherein a longDRX-Cycle is 128ms or 64ms, and wherein the second radio module is a WiFi radio module having WiFi beacon signal periodicity of 102.4ms or multiple of 102.4ms.

4. The method of claim 1, wherein the onDurationTimer is small enough such that collision probability between the first and the second radio modules is lower than a threshold value.

5. The method of claim 1, further comprising:
   transmitting an IDC interference indicator to the base station such that flexible extension for an ON duration in each DRX cycle is restricted to reduce collision probability between the first and the second radio modules.

6. The method of claim 1, further comprising:
   triggering an IDC interference mitigation mechanism based on an IDC interference measurement result, wherein the coexistence pattern information is transmitted to the base station when the IDC interference mitigation mechanism is triggered.

7. A wireless communication device, comprising:
   a first radio module that obtains traffic or scheduling information of a second radio module co-located with the first radio module;
   a control entity that determines a desired time-division multiplexing (TDM) pattern for the first radio module based on the traffic or scheduling information to mitigate in-device coexistence (IDC) interference with the second radio module; and
   a transmitter that transmits coexistence pattern information based on the desired TDM pattern to a base station, wherein the coexistence pattern information comprises a set of recommended discontinuous reception (DRX) configuration parameters and a recommended TDM pattern periodicity and a scheduling period, wherein the set of recommended DRX configuration parameters comprises an onDurationTimer, a DRX cycle, a DRX-Inactivity timer for onDuration extension.

8. The device of claim 7, wherein the coexistence pattern information comprises a time offset between a first DRX cycle start point and an incoming signal of the second radio module.

9. The device of claim 7, wherein a longDRX-Cycle is 128ms or 64ms, and wherein the second radio module is a WiFi radio module having WiFi beacon signal periodicity of 102.4ms or multiple of 102.4ms.

10. The device of claim 7, wherein the onDurationTimer is small enough such that collision probability between the first and the second radio modules is lower than a threshold value.

11. The device of claim 7, wherein the device transmits an IDC interference indicator to the base station such that flexible extension for an ON duration in each DRX cycle is restricted to reduce collision probability between the first and the second radio modules.

12. The device of claim 7, wherein the device triggers an IDC interference mitigation mechanism based on an IDC interference measurement result, wherein the coexistence pattern information is transmitted to the base station when the IDC interference mitigation mechanism is triggered.

13. A method comprising:
receiving time-division multiplexing (TDM) coexistence pattern information from a first LTE radio module in an long-term evolution (LTE) 3GPP wireless system, wherein the first LTE radio module and a second radio module are co-located in a same device platform, and wherein the coexistence pattern information comprises a set of recommended discontinuous reception (DRX) configuration parameters and a recommended TDM pattern periodicity and a scheduling period, wherein the set of recommended DRX configuration parameters comprises an onDurationTimer, a DRX cycle, a DRX-Inactivity timer for onDuration extension; and
determining a set of discontinuous reception (DRX) configuration parameters for the first radio module based on the TDM coexistence pattern information to mitigate in-device coexistence (IDC) interference between the first LTE radio module and the second radio module.

14. The method of 13, wherein the coexistence pattern information comprises a time offset between a first DRX cycle start point and an incoming signal of the second radio module.

15. The method of 13, wherein a longDRX-Cycle is configured to be 128ms or 64ms, and wherein the second radio module is a WiFi radio module having WiFi beacon signal periodicity of 102.4ms or multiple of 102.4ms.

16. The method of claim 13, wherein an onDurationTimer is configured to be small enough such that collision probability between the first and the second radio modules is lower than a threshold value.

17. The method of claim 13, further comprising:
receiving an IDC interference indication; and
restricting flexible extension of an ON duration within each DRX cycle to reduce collision probability between the first and the second radio modules.

* * * * *